Sept. 2, 1930.  P. N. BOSSART  1,775,016

RAILWAY TRAFFIC CONTROLLING APPARATUS

Original Filed June 20, 1928

INVENTOR:
P. N. Bossart,
by A. R. Vencill
His Attorney

Patented Sept. 2, 1930

1,775,016

UNITED STATES PATENT OFFICE

PAUL N. BOSSART, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY-TRAFFIC-CONTROLLING APPARATUS

Application filed June 20, 1928, Serial No. 286,993. Renewed February 7, 1930.

My invention relates to railway traffic controlling apparatus, and particularly to apparatus of the type comprising train carried governing means co-operating with devices located at intervals along the trackway.

I will describe two forms of apparatus embodying my invention and will then point out the novel features thereof in claims.

Figure 1:
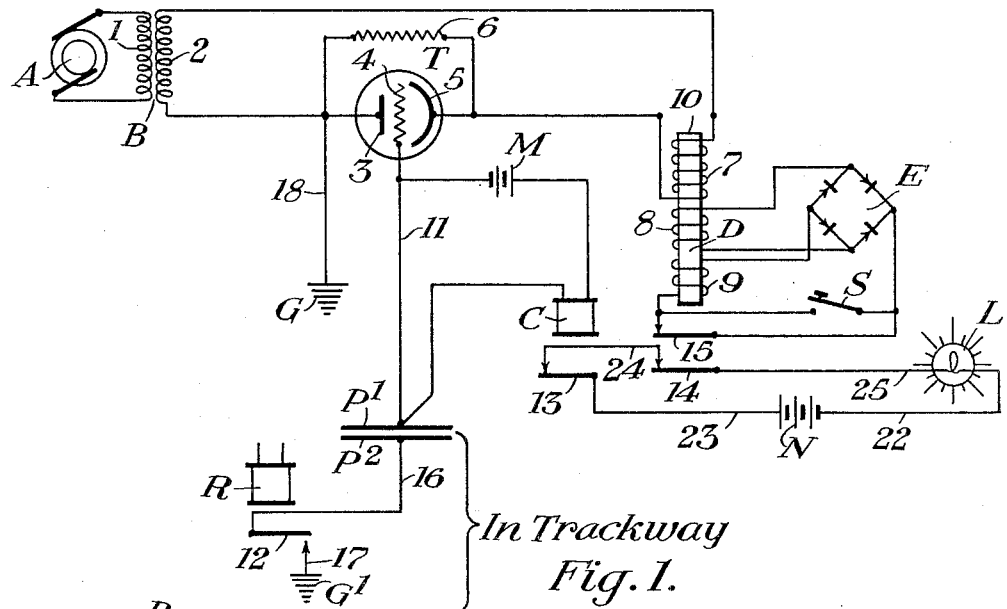
Figure 2:
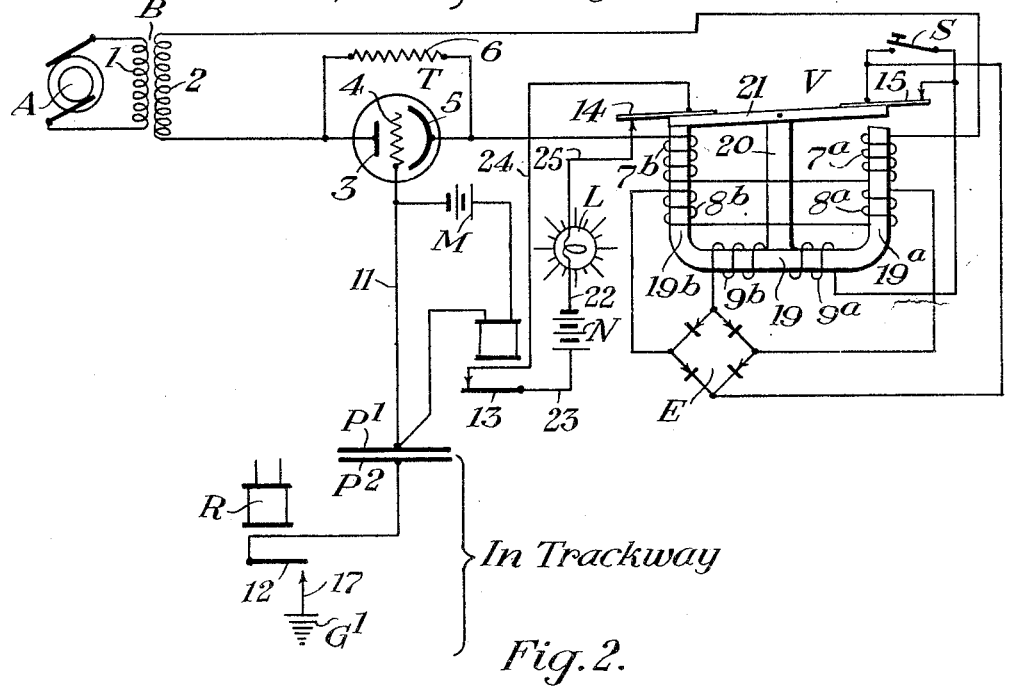

In the accompanying drawing, Fig. 1 is a diagrammatic view showing one form of railway traffic controlling apparatus embodying my invention. Fig. 2 is a view illustrating a modified form of a portion of the apparatus shown in Fig. 1, and also embodying my invention.

Similar reference characters refer to similar parts in both views.

Referring first to Fig. 1, the reference character T designates a train carried relay device here shown as a grid glow tube having a grid 4 and two spaced electrodes 3 and 5 inclosed in a sealed envelope filled with a suitable medium such as neon or nitrogen gas. If an alternating electromotive force, having a magnitude sufficiently great, is applied across electrodes 3 and 5 of a tube of the type described, the medium surrounding the electrodes becomes conducting and a unidirectional current flows from electrode 3 to electrode 5. The critical magnitude of the electromotive force necessary to cause the tube to become conducting, however, depends upon the potential and relative polarity of grid 4 with respect to electrode 3; this critical magnitude decreasing as the potential of grid 4 increases when the grid is positive with respect to electrode 3, but increasing as the potential of grid 4 increases when the grid is negative with respect to electrode 3. When grid 4 is on open circuit, the grid takes on a negative charge, and the magnitude of the electromotive force necessary to cause the tube to become conducting is then relatively high, but when grid 4 is connected with electrode 3, this negative charge leaks off and the magnitude of the electromotive force necessary to cause the tube to become conducting is then relatively low.

Associated with tube T is a differential relay D, which, as shown in the drawing, comprises a magnetizable core 10 provided with three windings 7, 8, and 9. Winding 7 is constantly supplied with alternating current through a resistance 6 from the secondary 2 of a transformer B, the primary 1 of which is connected with an alternator A. Winding 8 is normally connected with winding 9, through a double wave rectifier E, over a front contact 15 of relay D. Alternating current in winding 7 induces an alternating electromotive force in winding 8. When contact 15 is closed, unidirectional current is supplied to winding 9 through rectifier E, and a unidirectional flux is created in core 10, which flux holds the relay in its energized condition.

Resistance 6 is also connected across electrodes 3 and 5 of tube T, and impresses across these electrodes an alternating electromotive force. The parts are so proportioned, that when grid 4 of tube T is on open circuit, the potential drop across resistance 6 is not sufficient to render tube T conducting.

Electrode 3 of tube T is connected at G with ground, usually through an axle of the train. The reference character $P^1$ designates a train-carried condenser plate which is connected with grid 4 of tube T by means of a wire 11. Located in the trackway adjacent the path of travel of the train carried plate $P^1$ is another condenser plate $P^2$. The plate $P^2$ is at times connected with ground at $G^1$ over a back contact 12 of a relay R. Relay R may be controlled in any suitable manner. For example, relay R may be controlled by traffic conditions in advance in such manner, that, when traffic conditions are safe, relay R is energized to open contact 12, but that, when traffic conditions are dangerous, relay R is de-energized, so that contact 12 is closed.

The reference character C designates a checking relay which is connected in series with a battery M between the grid 4 of tube T and the train carried condenser plate $P^1$ to check the continuity of wire 11. This relay is normally energized, but in the event of a break in wire 11, the circuit for the relay is interrupted, and the relay opens its front contact 13.

Relays C and D control an electro-responsive governing device here shown as a lamp L. The lamp L is supplied with energy from a battery N over a circuit which passes from battery N through wire 22, lamp L, wire 25, front contact 14 of relay D, wire 24, front contact 13 of relay C, and wire 23 back to battery N. When this circuit is closed lamp L is lighted to display a proceed indication, but when this circuit is interrupted by opening either contact 14 of relay D or contact 13 of relay C, the lamp L is extinguished to display a stop indication.

Under normal conditions, that is, when the train-carried plate $P^1$ is not located over a trackway plate $P^2$, the grid 4 of tube T accumulates a negative charge so that the tube is non-conducting. Alternating current supplied to winding 7 of relay D through resistance 6 creates in core 10 of this relay an alternating flux, and this flux induces in winding 8, an alternating electromotive force which creates a unidirectional current in winding 9. As a result, the front contacts 15 and 14 of relay D are held closed. Relay C is also energized and lamp L is therefore lighted to indicate proceed.

In explaining the operation of the apparatus as a whole, I will first assume that the train passes a trackway plate $P^2$ having its associated relay R energized. The plate $P^2$ is then disconnected from ground so that the plate has no effect upon the train carried apparatus and the contacts of relay D remain closed so that lamp L continues to indicate proceed.

I will next assume that the train passes a trackway plate $P^2$ having its associated relay R de-energized. The plate $P^2$ is therefore connected with ground so that a circuit is provided for grid 4 of tube T which passes from grid 4, through wire 11, condenser plates $P^1$ and $P^2$, wire 16, back contact 12 of relay R, wire 17, to ground at $G^1$, thence from ground at G to wire 18 and electrode 3. This circuit permits the negative charge which normally forms on grid 4 to leak off, the potentials of electrode 3 and grid 4 becoming equal. Under these conditions, the potential drop across resistance 6 is sufficient to cause the tube to become conducting. Tube T permits the passage of current in one direction only, so that when the tube is conducting, current flows through this tube during alternate half cycles of the current supplied by secondary 2 of transformer B. The net result is that a unidirectional current flows in winding 7 of relay D in addition to the alternating current normally supplied to the winding through resistance 6. The parts of relay D are so proportioned that the unbalanced current thus supplied to winding 7 creates a unidirectional flux in core 10 which is equal and opposite to the unidirectional flux created in core 10 by the rectified current in winding 9. These two fluxes therefore neutralize each other and relay D opens its front contacts. When front contact 15 of the relay opens, the circuit for winding 9 becomes open, and the contacts of the relay remain open after plate $P^1$ has passed plate $P^2$. Furthermore, the opening of front contact 14 of relay D interrupts the circuit for lamp L, so that this lamp is extinguished to provide a stop indication.

For the purpose of restoring the apparatus to its normal condition, a normally open, manually controlled switch S is connected in multiple with front contact 15 of relay D. When this switch is closed, the circuit for winding 9 is completed at this switch and relay D picks up. After the relay has picked up, contact 15 is closed, and the relay is held picked up until the next trackway plate $P^2$ is passed when traffic conditions are dangerous. When the train passes over a trackway plate $P^2$ which is connected with ground, the train-carried relay D is not maintained in its energized condition by the alternating flux in core 10, for the following reason. The alternating flux present in core 10 under this condition is only that due to the transformer exciting current in coil 7, and is insufficient to hold the relay armature in its attracted position. It is well known that the magnetic flux in a loaded transformer is very much less than that which would be present in the transformer core if the same current were present in either the primary alone or the secondary alone. Consequently, when coil 8 of relay D carries the rectifier load current, the magnetic field due to this coil neutralizes the greater part of the magnetic field of the load component of the current in coil 7, so that the net flux in core 10, due to coils 7 and 8, is only that caused by the relatively small exciting current component of coil 7, and the value of this net flux is insufficient to keep the relay closed. However, the unidirectional current in coil 9 sets up a flux sufficient to close the relay and to keep it closed, because coil 9 carries only direct current. This flux is not neutralized, because it is practically steady on account of the smoothing properties of the rectifier E, and a steady flux creates no reaction in the associated circuits. Any current induced directly from coil 7 to coil 9 can flow only in such direction as to increase this flux, because the rectifier E blocks the flow of current in the reverse direction. Consequently, the current in coil 7, which is effective to produce a tractive effort on the relay armature, is only that due to the small exciting current portion of the total current, while the tractive effort producing current in coil 9 is comparable to the full load current of the transformer secondary 8. It should be noted that core 10 is an open circuit core, so that the transformer of which it is a part is highly reactive. It follows that the alternating current flux available in the lower end of this core is small compared to the flux in the exciting coil. Furthermore, a low value of alternating flux will ordinarily be used, so that the superposed unidirectional flux becomes predominant in core 10.

Referring now to Fig. 2, I have here shown a polarized relay V comprising a U-shaped magnetizable core 19 which is divided into two sections $19^a$ and $19^b$ by an upwardly extending permanently magnetized arm 20. An armature 21 of magnetizable material is pivoted on the upper end of arm 20 and is arranged to be swung toward one or the other of sections $19^a$ or $19^b$ in accordance with the direction of the flux in the core. Section $19^a$ of core 19 is provided with three windings $7^a$, $8^a$, and $9^a$, and section $19^b$ is provided with three similar windings $7^b$, $8^b$, and $9^b$. The windings $7^a$ and $7^b$ are connected in series in such manner that when current is supplied to these windings, the magnetic fluxes created in core 19 are additive. Windings $7^a$ and $7^b$ are connected in series with resistance 6 and secondary 2 of transformer B in place of winding 7 of relay D shown in Fig. 1.

Windings $8^a$ and $8^b$ are connected in series in such manner that the alternating electromotive forces induced therein by the alternating current in windings $7^a$ and $7^b$ are additive. Windings $9^a$ and $9^b$ are connected with windings $8^a$ and $8^b$ through rectifier E over contact 15 of relay V. A normally open manually controlled switch 2 is connected in multiple with contact 15 of relay V in the same manner as in Fig. 1. When contact 15 is closed, the unidirectional current which is supplied to windings $9^a$ and $9^b$ through rectifier E creates in core 19 unidirectional fluxes which are additive, and which hold the armature 21 in the position illustrated in the drawing, so that contacts 14 and 15 are held closed.

Under normal conditions, the lamp L is therefore lighted to indicate proceed. When the train passes a trackway plate $P^2$ having its associated relay R energized, the plate $P^2$ has no effect upon the train carried apparatus and lamp L remains lighted to indicate proceed.

When the train passes a trackway plate $P^2$ having its associated relay R de-energized, however, the negative charge normally existing on the grid 4 of tube T leaks off as explained in connection with Fig. 1, and the tube T then becomes conducting to alternate half cycles of the current supplied by secondary 2 of transformer B. As a result, a unidirectional current flows in windings $7^a$ and $7^b$ in addition to the alternating current normally supplied to these windings through resistance 6. As a result of this additional unidirectional current, an additional unidirectional flux is created in core 19. The parts of relay V are so arranged and proportioned that this flux is in the opposite direction from and of greater magnitude than the flux created in core 19 by the unidirectional current flowing in windings $9^a$ and $9^b$. The direction of the resultant unidirectional flux in the core 19 is therefore reversed, and armature 21 is then swung in a clockwise direction toward section $19^a$, thereby opening contacts 14 and 15. The circuit for windings $9^a$ and $9^b$ is then interrupted and the relay stays in this reversed position until switch S is closed to restore the armature to its original position.

Although I have herein shown and described only two forms of railway traffic controlling apparatus embodying my invention, it is understood that various changes and modifications may be made therein within the scope of the appended claims without departing from the spirit and scope of my invention.

Having thus described my invention, what I claim is:

1. In combination, a train-carried tube comprising two spaced electrodes and a grid in a medium which forms a conducting path between said electrodes when and only when the potential between the electrodes exceeds a value which depends upon the relative potential of said grid with respect to one of said electrodes, a source of electromotive force on the train, a relay, means including said relay for connecting said source across said electrodes, a first condenser plate located on the train, a second condenser plate located in the trackway adjacent the path of travel of said first plate, means including said two condenser plates for controlling the relative potential of said grid, and governing means controlled by said relay.

2. In combination, a train-carried tube comprising two spaced electrodes and a grid in a medium which forms a conducting path between said electrodes when and only when the potential between the electrodes exceeds a value which depends upon the relative potential of said grid with respect to one of said electrodes, a source of electromotive force on the train, a relay having three windings, means including one of said windings for connecting said source across said electrodes, an impedance connected across said electrodes, a rectifier, means including said rectifier and a front contact of said relay for connecting the remaining two windings together, means located partly in the trackway for controlling the relative potential of said grid with respect to said one electrode, and governing means controlled by said relay.

3. In combination, a train-carried tube comprising two spaced electrodes and a grid in a medium which forms a conducting path between said electrodes when and only when the potential between the electrodes exceeds a value which depends upon the relative potential of said grid with respect to one of said electrodes, a source of electromotive force on the train, a first relay, means including said first relay for connecting said source across said electrodes, a train-carried condenser plate, a conductor connecting said train-carried plate with said grid, a second relay, a circuit for said second relay including said conductor, a second condenser plate located in the trackway adjacent the path of travel of said train-carried plate, means including said conductor and said condenser plates for controlling the relative potential of said grid with respect to said one electrode, and governing means controlled by said relay.

4. In combination, a train-carried tube comprising a first and second spaced electrodes and a grid in a medium which forms a conducting path between said electrodes when and only when the potential between the electrodes exceeds a value which depends upon the relative potential of said grid with respect to the first said electrode, a source of alternating electromotive force on the train; a differential relay having a first, second, and third windings; means including the first winding of said differential relay for connecting said source across said electrodes, a resistance connected across said electrodes, a rectifier, means including said rectifier and a front contact of said differential relay for connecting said second winding with said third winding, a train-carried condenser plate, a conductor connecting said train-carried plate with said grid, a second relay, a circuit for said second relay including said conductor, a second condenser plate located in the trackway adjacent the path of travel of said train-carried plate, means for connecting said trackway plate with ground when traffic conditions are dangerous, means for constantly connecting the first electrode with ground, and traffic governing means controlled by said relay.

5. In combination, a train-carried tube comprising a first and second spaced electrodes and a grid in a medium which forms a conducting path between said electrodes when and only when the potential between the electrodes exceeds a value which depends upon the relative potential of said grid with respect to the first said electrode, a first source of electromotive force on the train, a first relay having three windings, means including one of said windings for connecting said first source across said electrodes, a rectifier, means including said rectifier and a contact of said first relay for connecting said remaining two windings together, a train-carried condenser plate connected with said grid, a second condenser plate located in the trackway adjacent the path of travel of said train-carried condenser plate, means controlled by traffic conditions for at times grounding said trackway plate, means including the train for grounding the first said electrode, and traffic governing means controlled by said relay.

6. In combination, a train-carried tube comprising a first and second spaced electrodes and a grid in a medium which forms a conducting path between said electrodes when and only when the potential between the electrodes exceeds a value which depends upon the relative potential of said grid with respect to the first said electrode, a polarized relay on the train comprising a U-shaped magnetizable core divided into two sections by a permanently magnetized arm, a magnetizable armature pivotally mounted on said arm and arranged to be swung toward one or the other of said sections in accordance with the direction of the flux in the core, a first winding on the core, a source of alternating electromotive force, means including said first winding for connecting said source across said electrodes, a second winding on said core having an alternating electromotive force induced therein by transformer action, a third winding on said core, a rectifier, means including said rectifier and a contact of said relay for connecting said third winding with said second winding to normally create a first unidirectional flux in said core, means located partly in the trackway and controlled by traffic conditions for at times causing said tube to become conducting to supply said first winding with unidirectional current which creates a second unidirectional flux in said core having a greater magnitude than the first flux and having an opposite polarity, and governing means on the train controlled by said relay.

7. In combination, a train-carried tube comprising two spaced electrodes and a grid in a medium which forms a conducting path between the electrodes when and only when the negative potential of the grid with respect to one such electrode is below a predetermined value, a source of electromotive force on the train, a relay, means including the relay for connecting said source across said electrodes, a first condenser plate located on the train, a second condenser plate located in the trackway adjacent the path of travel of the first plate, means including said two condenser plates for controlling the negative potential of said grid, and governing means controlled by said relay.

8. In combination, a train-carried tube comprising two spaced electrodes and a grid in a medium which forms a conducting path between the electrodes when and only when the negative potential of the grid with respect to one such electrode is below a predetermined value, a source of electromotive force on the train, a relay having three windings, means including one of said windings for connecting said source across said electrodes, an impedance connected across said electrodes, a rectifier, means including said rectifier and a front contact of said relay for connecting the remaining two windings together, means located partly in the trackway for controlling the negative potential of said grid with respect to one such electrode, and governing means controlled by said relay.

9. In combination, a train-carried relay having a core carrying a winding, means for normally supplying alternating current to said winding, means receiving energy from said winding for normally supplying said core with a first unidirectional flux, means controlled in part from the trackway for at times supplying unidirectional current to said winding to oppose said first flux, and governing means on the train responsive to the flux in said core.

10. In combination; a train-carried relay having a core carrying a first, second, and third windings; means for supplying alternating current to said first winding, a rectifier, means including the rectifier for supplying said third winding with unidirectional current from said second winding to normally create a first unidirectional flux in said core, means controlled in part from the trackway for at times supplying unidirectional current to said first winding to oppose said first unidirectional flux, and governing means on the train responsive to the flux in said core.

11. In combination, a relay comprising a core carrying a winding, means for normally supplying alternating current to said winding, a second winding on said core receiving energy from said first winding, a rectifier, a third winding on said core, means including said rectifier and a front contact of said relay for connecting said second winding with said third winding in such manner that a first unidirectional flux is created in said core; means located partly in the trackway and controlled by traffic conditions for at times supplying unidirectional current to said first winding to create in said core a second unidirectional flux which has a magnitude equal to, but a polarity opposite from said first flux, and traffic governing means controlled by said relay.

12. In combination, a train-carried relay comprising a U-shaped magnetizable core divided into two sections by an upwardly extending magnetized arm, a magnetizable armature pivotally mounted on said arm and arranged to be swung toward one or the other of said sections in accordance with the direction of the flux in the core, a first winding on said core, means for constantly supplying said first winding with alternating current, a second winding on said core having an alternating electromotive force induced therein by transformer action, a third winding on said core, a rectifier, means including said rectifier and a contact of said relay for connecting said third winding with said second winding to normally create a first unidirectional flux in said core; means controlled in part from the trackway for at times supplying unidirectional current to said first winding to create in said core a second unidirectional flux having a greater magnitude than, and an opposite polarity from, said first unidirectional flux; and governing means on the train controlled by said relay.

In testimony whereof I affix my signature.

PAUL N. BOSSART.